United States Patent [19]
Solomon

[11] Patent Number: 5,196,902
[45] Date of Patent: Mar. 23, 1993

[54] TWO-BEAM INTERFEROMETER APPARATUS AND METHOD, AND SPECTROMETER UTILIZING THE SAME

[75] Inventor: Peter R. Solomon, West Hartford, Conn.

[73] Assignee: Advanced Fuel Research, Inc., East Hartford, Conn.

[21] Appl. No.: 773,225

[22] Filed: Oct. 9, 1991

[51] Int. Cl.$^5$ .............................................. G01B 9/02
[52] U.S. Cl. ................................................... 356/346
[58] Field of Search ................ 356/346, 345, 351, 358

[56] References Cited

U.S. PATENT DOCUMENTS

| | | | |
|---|---|---|---|
| 4,329,055 | 5/1982 | Schaefer et al. | 356/346 |
| 4,383,762 | 5/1983 | Burkert | 356/346 |
| 4,654,530 | 3/1987 | Dybwad | 356/346 |
| 4,847,878 | 7/1989 | Badeau | 356/346 |
| 4,915,502 | 4/1990 | Brierley | 356/346 |

OTHER PUBLICATIONS

Griffiths and DeHaseth, "Fourier Transform Infrared Spectrometer"; John Wiley & Sons, N.Y., Chapter 4, pp. 121-165, 1986.
Jones, R. V., "Some Uses of Elasticity in Instrument Design"; *J. Sci. Instrum.*, 39, 193-203, 1962.
Jones, R. V. and Young, I. R., "Some Parasitic Deflexions in Parallel Spring Movements"; *J. Sci. Instrum.*, 33, 11-15 1956.
Bradley, D. J., "Parallel Movement For High Finesse Interferometric Scanning"; *J. Sci. Instrum.*, 39, 41-45 1962.
Smith, S. T. et al., "Design and Assessment of Monolithic High Precision Translation Mechanisms", *J. of Physics.*, 977-983.

*Primary Examiner*—Samuel A. Turner
*Attorney, Agent, or Firm*—Ira S. Dorman

[57] ABSTRACT

A two-beam interferometer for Fourier spectroscopy comprises one or two reflecting channels, each having at least one relatively movable wall to vary the path length of a beam traversing the same. A beam passing through the channel makes multiple reflections therewithin, impinges upon a retroreflector, and is transferred back through the channel along the same path to recombine with a second beam, which can be similarly reflected. The multiple reflections that occur within the channel allow a large total path length change to be accomplished with a small degree of motion of the movable wall, to thereby achieve high levels of resolution.

25 Claims, 4 Drawing Sheets

TWO-BEAM INTERFEROMETER APPARATUS AND METHOD, AND SPECTROMETER UTILIZING THE SAME

BACKGROUND OF THE INVENTION

Two-beam interferometer spectrometers are well known in the art. Most of the modern spectrometer designs, including the Michelson interferometer spectrometer, are described in Griffiths and DeHaseth, *Fourier Transform Infrared Spectrometer*, John Wiley & Sons, N.Y., Chapter 4, 121-165 (1986).

The Michelson interferometer functions by dividing an incident beam of electromagnetic radiation into two separate beams at a beamsplitter, each of which beams is caused to travel along a different optical path; one of the beams is usually directed along a reference path having a fixed optical length, while the other is simultaneously directed along a path of variable length. A retro-reflecting element, such as a plane mirror, a cube corner, or a "cats eye" reflector, is placed in the optical path of each beam to return it to the beamsplitter, where the beams recombine to form a single exit beam. The optical path length variation, which is typically achieved by moving one of the retroreflectors, causes the combined exit beam to be amplitude modulated due to interference between the recombining beams. By converting the interferogram so obtained into an electrical signal, and by then analyzing that signal in a known manner, the spectrum or intensity of the input radiation can, after suitable calibration, be derived as a function of frequency.

More particularly, when such an interferometer is employed in a Fourier transform spectrometer, the exit beam is focused upon a photoconductive detector to produce the electrical interferogram signal. If a sample is so placed that the modulated beam passes through it prior to impinging upon the detector, the analysis performed can determine the absorption spectrum of the sample; other placements of the sample, and other of its characteristics, can be employed and obtained as well.

In those instances in which the optical path length through the interferometer is varied by displacement of a retroreflecting element along the optical axis of the beam, it will be appreciated that the maximum resolution attainable with the instrument is directly related to the maximum path difference that can be produced; i.e., to the maximum longitudinal displacement that is attained by moving the retroreflecting element. Because Michelson interferometers rely upon the wave interference that occurs when the two beams recombine at the beamsplitter, an important factor in determining the quality of such a device is the degree to which the optical elements remain aligned during path-length variation. Accordingly, longitudinal displacement of the moving mirror must be effected with extreme accuracy over the entire range of its travel; i.e., the moving mirror must in most cases remain aligned to within a small fraction of the wavelength of incident light, over a longitudinal displacement of several centimeters. Any irregularity in the mirror guide path, such as might cause even slight tilting of a plane mirror, will lead to significant distortion in the interferogram produced. It is of course well known that substitution of cube-corner and cats-eye retroreflectors for plane mirrors can essentially eliminate such distortion problems; but it is known as well that the use of those elements also entails certain inherent drawbacks.

Precision air bearings and the like have been employed in modern interferometers in an effort to satisfy the extreme accuracy requirements to which movable mirror guides are subject. Such systems are however quite expensive, and moreover they require a supply of pressurized gas for operation. Electronic control systems, with feedback to automatic positioners, have also been utilized as a means for dynamically maintaining mirror alignment; satisfactory self-aligning systems are however difficult to design, and they tend to be relatively large and expensive.

In view of these drawbacks, substantial effort has been devoted to the development of high-quality interferometers that do not rely upon precision bearings or electronic alignment control systems. One approach taken utilizes a tiltable reflector assembly consisting of a pair of parallel, confronting mirrors, rather than a longitudinally displaced retroreflector. As an ostensible improvement thereupon, U.S. Pat. No. 4,915,502, issued on Apr. 10, 1990, teaches a twin-arm interferometer spectrometer having a tiltable reflector assembly by which the optical path lengths of both interferometer beams are varied simultaneously, thereby achieving a desired total path difference by a much smaller rotation of the paired mirrors then would otherwise be required. Such a design affords the advantage of insensitivity to linear movement of the optical element (i.e., only angular displacements will change the path length); moreover, rotating bearings are generally easier and less expensive to produce than are longitudinal or linear ones.

Also of interest is U.S. Pat. No. 4,383,762, issued May 17, 1983, which provides a two-beam interferometer for Fourier spectroscopy in which a rigid pendulum arm is used to mount moving cube corner retroreflectors. The pendulous movement (arcuate oscillation) enables accurate optical path-length variation to be produced in a smoothly guided motion, and the cube corner retroreflectors render the optical system unaffected by the resultant tilt; this avoids the disadvantages for Fourier spectroscopy that are inherent in the deviation from strict linearity that characterizes such pendulous motion.

So-called "porch swing" mounting arrangements are also known in the art, in which structural elements, supported at four pivot points, form a parallelogram by which a mirror, mounted at right angles to one side of the parallelogram, can be translated along an axis that is perpendicular to the mirror's plane. While such designs can provide inexpensive systems in which mounted mirrors are constrained to linear motion, due to the relatively large displacement distances that were deemed necessary they have not herefore been considered practical for use in instruments in which high resolutions are to be realized.

Despite the activity in the art indicated by the foregoing, therefore, a need remains for an interferometer that is compact, stable, and reliable, while also being capable of affording high degrees of resolution and accuracy. Accordingly, it is a broad object of the present invention to provide such an interferometer.

More specific objects of the invention are to provide such an interferometer in which multiple reflections of radiation beams allow large total path length changes to be produced in response to relatively small displacements of movable parts, and which is not subject to the adverse effects of normal vibration, thermal expansion, tilting, and misalignment.

Other objects of the invention are to provide an interferometer having the foregoing features and advantages, which is in addition of relatively incomplex design and construction, and hence is relatively facile and inexpensive to manufacture.

Related objects of the invention are to provide a novel spectrometer that incorporates an interferometer having the foregoing features and advantages, and also to provide a novel radiation amplitude-modulation method that can be carried out quickly and with a high degree of accuracy, utilizing the principles described herein.

SUMMARY OF THE INVENTION

It has now been found that certain of the foregoing and related objects of the invention are attained by the provision of a two-beam interferometer comprising mounting means, first and second walls supported by the mounting means and spaced from one another so as to define a channel therebetween, a beamsplitter disposed at one end of the channel, and retroreflecting means disposed at the opposite end thereof. The walls of the interferometer have confronting, specularly reflecting planar surfaces extending longitudinally therealong, on axes substantially parallel to the axis of the channel, and the mounting means supports the walls for such relative movement as will effect variation of the spacing between them while maintaining the parallelism of the axes of the reflective surfaces. Electromagnetic radiation focused upon the beamsplitter may be partially directed into one end of the channel, and toward the opposite end thereof, so as to traverse a path in which the beam reflects alternatingly between the specular surfaces, impinges upon the retroreflecting means, and is returned along the same path to the beamsplitter.

In a more specific embodiment, the mounting means of the interferometer may be of parallelogrammic character, and comprised of at least one pair of linking members. One end portion of both of the linking members will be operatively attached to the "first" wall, and a spaced, opposite end portion thereof will be attached to the "second" wall. The structure, spacing and attachment of the linking members will be such as to constrain the first wall to relative movement in planes substantially parallel to a plane of the second wall.

In a second specific embodiment, the interferometer employs pendulous mounting means comprised of fixed support structure and a depending linking member having opposite end portions longitudinally spaced from one another. One end portion of the linking member will be rotatably attached to the support structure and the opposite end portion thereof will be attached to the "first" wall, with the latter being suspended by the linking member and constrained against angular displacement about the longitudinal axis thereof. The reflecting surfaces utilized in such an interferometer will normally be so constructed and disposed as to compensate for the tilting that occurs in the first wall relative to the second; preferably, each of the reflecting surfaces will comprise two planar components, positioned so as to form with one another an elongated, right-angle corner reflector. The interferometer of the invention will normally include second retroreflecting means, so disposed as to receive radiation from the beamsplitter along a second path, and as to reflect such received radiation for return to the beamsplitter along the same path.

In especially preferred embodiments the interferometer will additionally include a third wall supported by the mounting means, with the first wall being interposed between it and the second wall. The first and third walls of such a device will define a second channel that has opposite ends in general lateral registry with the corresponding ends of the first channel, and that has a longitudinal axis substantially parallel to the axis thereof; those walls will also have confronting, specularly reflecting planar surfaces that extend longitudinally along and substantially parallel to the axis of the second channel. The mounting means will, in such embodiments, so support the walls as to enable relative movement of the first wall with respect to both the second and the third walls, and so as to maintain the second and third walls in fixed positions with respect to one another; this will in turn enable the spacing of the first wall from the second and third walls to be simultaneously varied, in inverse relationship to one another, while maintaining the original orientation of the axes of all of the reflective surfaces so as to keep them substantially parallel. In such an interferometer the beamsplitter will be disposed substantially intermediate the second and third walls, at one end of both of the channels, and second retroreflecting means will be positioned at the opposite end of the channels. As a result, radiation may be directed from the beamsplitter partially into the second channel as well as into the first, to reflect in like manner along a second path, to impinge upon the second retroreflecting means, and to be returned along virtually the same path to the beamsplitter.

Other objects of the invention are attained by the provision of a spectrometer, in which is incorporated a two-beam interferometer of the character herein described. The spectrometer will additionally include means for producing a collimated beam of electromagnetic radiation, a sample compartment, a photoconductive detector, electronic data processing means, optics for transferring a radiation beam from the means for producing sequentially through the interferometer and the sample compartment and onto the detector, and circuitry operatively electrically interconnecting the several components. Radiation originating at the means for producing and impinging upon the beamsplitter may, after passing through the interferometer, traverse the sample compartment and impinge upon the detector, so as to thereby generate an electrical signal for analysis by the data processing means. In preferred embodiments the invention provides a Fourier-transform spectrometer.

Other objects of the invention are attained by the provision of a method for amplitude modulation of a radiation beam, in which method a channel having the features herein described is employed. A source beam of electromagnetic radiation is caused to impinge upon a beamsplitter so as to produce therefrom two beam components (normally, a reflected and a nonreflected component). One of these beam components is directed into one end of the channel toward its opposite end and at an acute angle to its axis, to thereby cause it to reflect alternatingly between the reflecting surfaces along a first path, and to return along virtually the same path to the beamsplitter after being retroreflected at the opposite end of the channel. The other beam component is simultaneously directed along a second path, and it is retroreflected to return therealong to the beamsplitter, where it recombines with the first component. By continuously and reciprocally varying the spacing between the reflecting surfaces, while maintaining the original orientation thereof, the beam components are caused to recombine in varying phase relationships to one another, so as to thereby produce an amplitude-modulated exit beam at the beamsplitter.

In the preferred embodiments of the method, the second path will be defined by a second channel similar to the first, into which the "other" or second beam component will be directed for traversal and return to the beamsplitter. The source beam employed will normally be of a spectral character, and in most instances the modulated beam will be passed through or upon a sample, and thereafter upon a photoconductive detector, so as to produce an electrical interferogram signal containing information that is indicative of an optical property of the sample. Such a method will normally include a further step of analysis of the interferogram signal so as to determine a value for the measured optical property; analysis will most desirably be performed using a Fourier-transform technique, typically using source radiation in the infrared region of the spectrum.

DETAILED DESCRIPTION OF THE PREFERRED AND ILLUSTRATED EMBODIMENTS

Figure 1:
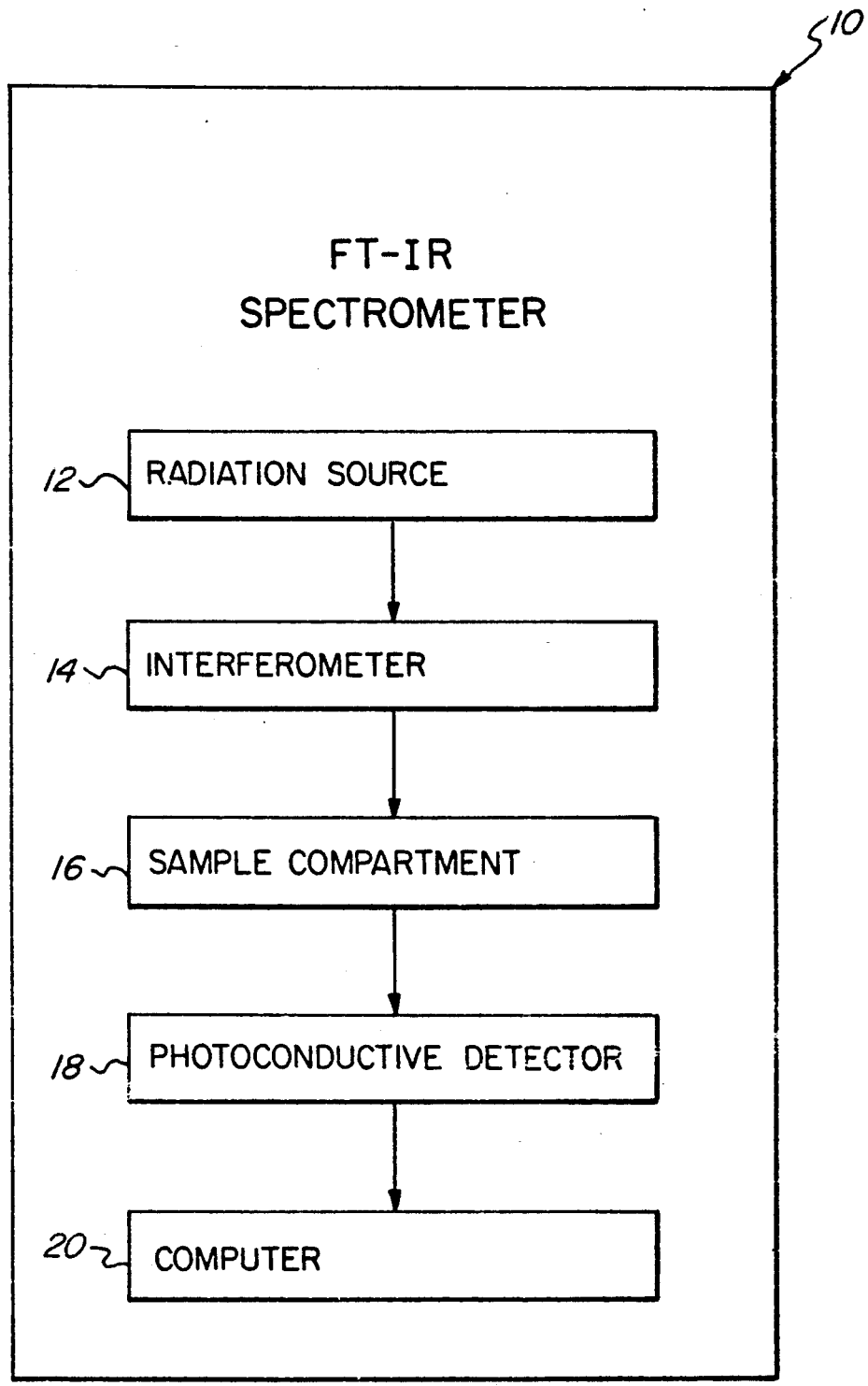
FIG. 1 is a schematic block diagram of a Fourier transform infrared (FT-IR) spectrometer embodying the present invention.

Turning initially to FIG. 1 of the drawings, therein schematically illustrated is an FT-IR spectrometer embodying the present invention, generally designated by the numeral 10. The spectrometer includes a radiation source 12 capable of producing a collimated beam of infrared radiation, which is directed (by suitable transfer optics, not shown) into the interferometer, generally designated by the numeral 14, by which it is amplitude modulated as a function of frequency. After passing through the sample compartment 16, the interferogram beam is caused to impinge upon a photoconductive detector 18, the output electrical signal from which is then subjected to analysis in the computer 20 to provide desired analytic data.

Figure 2:
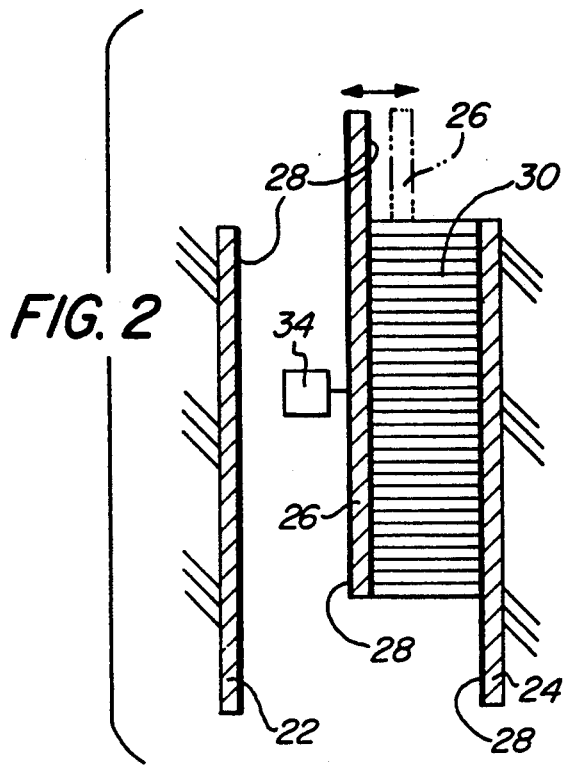
FIG. 2 is a schematic plan view of one form of a channel-defining wall assembly suitable for use in an interferometer embodying the present invention, with an alternate position of the intermediate wall being shown in phantom line.
Figure 3:
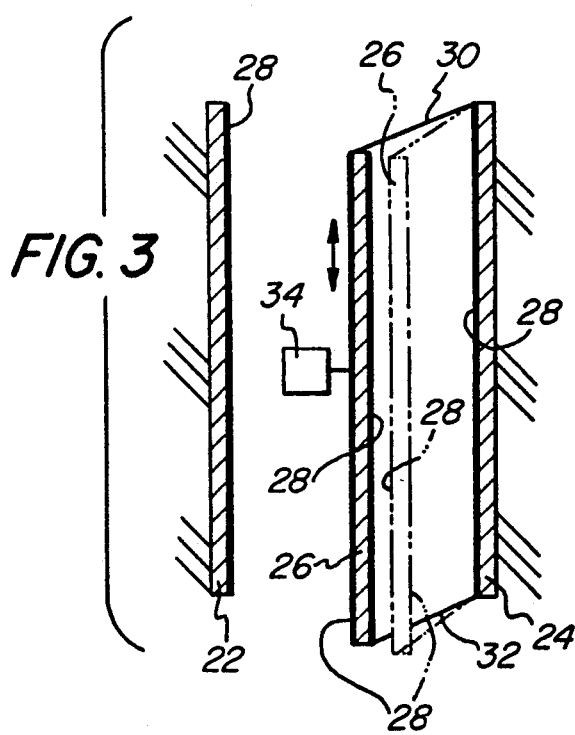
FIG. 3 is a schematic, end elevational view of the assembly shown in FIG. 2.

A specific form of wall arrangement, utilized for defining reflective paths through an interferometer embodying the invention, is illustrated in FIGS. 2 and 3. The assembly consists of two stationary outer walls 22, 24 (supported by means not specifically suggested), and a movable inner wall 26, the confronting surfaces of which walls 22, 24, 26 mount planer mirrors 28. The inner wall 26 is attached at the top and bottom to the stationary wall 24 by linking elements 30, which are of equal length and are connected at their opposite ends by flexible means; this parallelogrammic assembly serves of course to constrain the wall 26 to movement in parallel planes, and to maintain at least substantial parallelism with respect to the planes of walls 22 and 24. A drive mechanism 34 (which may be of a piezoelectric, magnetic or mechanical nature) is operatively connected to the inner wall 26 and serves to reciprocate it between alternative positions, constantly and at a controlled rate of speed.

As wall 26 is caused to oscillate vertically (in the orientation depicted), the linking elements 30, 32 constrain it to lateral movement in parallel planes, narrowing one of the channels while simultaneously widening the other, with the plane mirrors 28 in turn always being maintained substantially parallel to one another. Needless to say, the phantom line representation of FIGS. 1 and 2 show the wall 26 displaced (from the full-line, centralized position) to a position closer to the wall 24 and further from the wall 22. This will of course cause a beam directed into the channel between walls 24 and 26 (in the phantom line relationship depicted) to follow a shorter traversal path distance than a beam into the channel between the walls 22 and 26, which will be commensurately lengthened.

Figure 4:
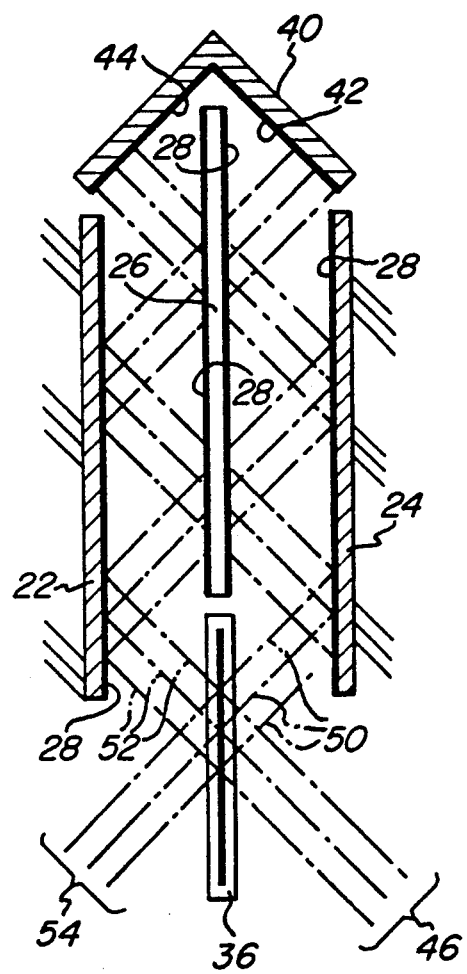
FIG. 4 is a schematic plan view of an interferometer incorporating the wall assembly shown in FIGS. 1 and 2, including a beamsplitter and retroreflecting mirrors, in which is diagrammatically illustrated the paths of the beam components through the two reflective channels defined.

Turning now to FIG. 4 (wherein the same reference numbers are used to designate parts common to the preceding Figures), collimated electromagnetic radiation 46 is directed upon a partially reflecting beamsplitter 36, by which the input beam is divided into two separate component beams, a reflected component 50 and a transmitted component 52. Both beam components impinge upon the mirrors 28 defining the paths through their respective channels; as will be noted, the beamsplitter 36 is generally parallel to the planes of the mirrors 28, and the beams make four reflections in traversing the channels in each direction. Upon exiting the opposite ends of the channels, the components 50, 52 strike the planer reflective surfaces 42, 44 of retroreflector 40, respectively, which surfaces are orientated with strict perpendicularity to the emerging beams so as to cause the beam components to precisely retrace their original paths reversely through the channels, recombining at the beamsplitter 36 and forming exit beam 54. That beam is directed toward a focusing element (not shown), through a sample in the compartment 16 (in the embodiment depicted by FIG. 1), and finally onto a photoconductive detector 18.

Figure 5:
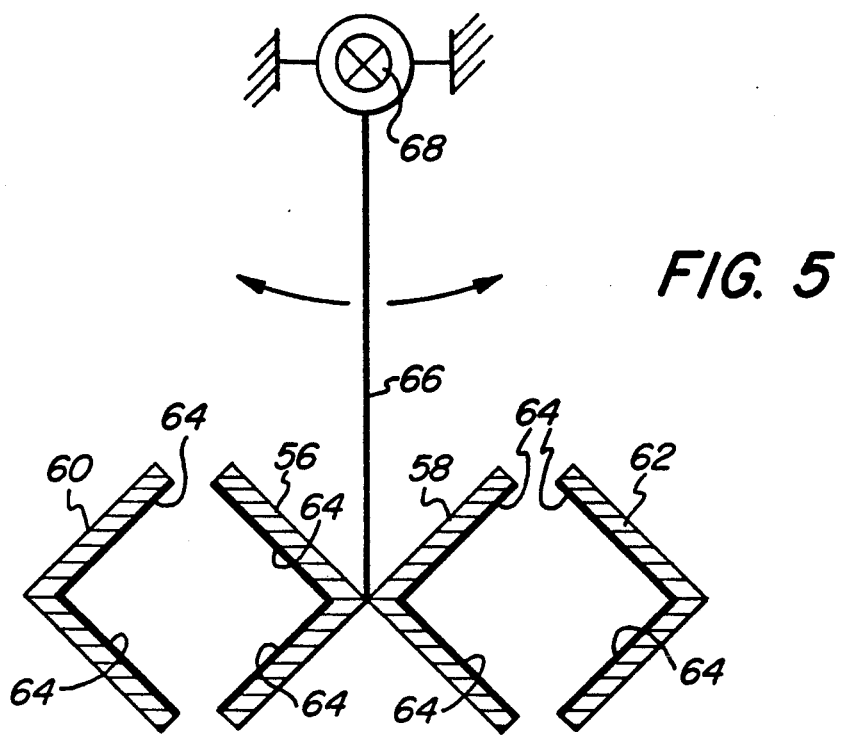
FIG. 5 is a schematic, end elevational view of a second assembly of reflective walls that is suitable for use in an interferometer embodying the present invention.

FIG. 5 illustrates a second form of reflective channel-defining walls, wherein each of the walls 56, 58, 60, 62 is of right-angular corner form (and, although not shown, elongated in the direction normal to the plane of the page). Planar mirrors 64 are provided upon the confronting surfaces of the components forming the right-angle walls 56–62, thus cooperating to define two laterally adjacent, parallel channels onto which beams may be directed, as described in connection with FIGS. 2–4.

In this assembly, however, the inner structure (constituted by the back-to-back walls 56 and 58) is in the form of a pendulum, suspended by a rigid arm 66 that is rotatably journaled at its upper end by a pivot mount 68 (again supported by structure, only suggested), and driven by suitable means (not shown). Although the arcuate oscillation of the inner wall structure 56, 58 causes deviation from rectilinear displacement, and thus causes the reflective surfaces thereon to tilt with respect to the confronting surfaces on the stationary outer walls 60, 62, the right-angle corner geometry compensates for the optical distortions that would otherwise be produced.

Figure 6:
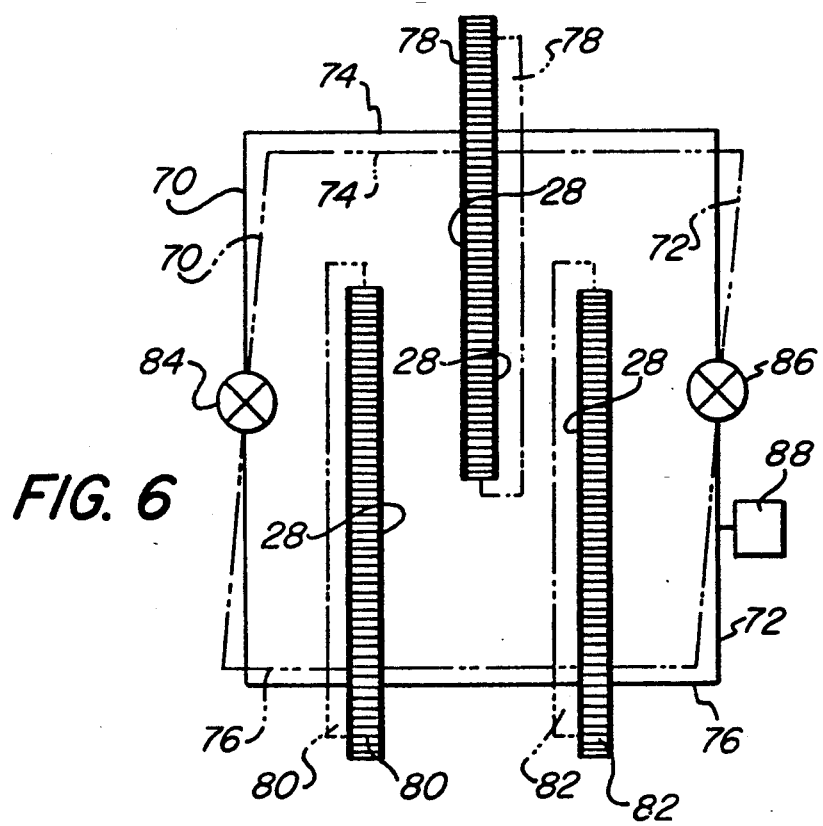
FIG. 6 is a plan view similar to that of FIG. 2, showing a balanced mounting system for the interferometer walls.

Turning now to FIG. 6, therein illustrated is an alternative arrangement for mounting the mirrors and supporting walls of an interferometer embodying the invention, which is mechanically balanced about its pivot points, and hence affords optimal levels of mechanical stability. The system comprises a frame of four rigid plates 70, 72, 74 and 76, flexibly joined to one another at the corners. Wall 78 is rigidly mounted on the upper plate 74, with its plane normal to that of the plate, and walls 80 and 82 are similarly mounted on the lower plate 76; end plates 70 and 72 are pivotably supported midway along their lengths at 84 and 86, and a beam-splitter (not shown) is so disposed as to project radiation from an incident beam into the two channels so defined (i.e., it will lie in a generally parallel to the planes of the mirrors 28 on the walls 78–82, and in registry therewith).

Consequently, when force is applied to plate 72, through activation of an operatively connected drive mechanism 88, a distortion of the original rectangular geometry is produced, by which the frame plates and the attached walls are brought to the parallelogrammic relationship shown in phantom line. This reconfiguration of the frame moves the confronting mirrors 28 on the walls 78 and 82 closer to one another while simultaneously increasing the distance between the mirrors 28 on the walls 78 and 80; the parallel orientation of the mirror planes will of course be maintained in all positions.

It will be appreciated that an arrangement similar to that of FIG. 6 could be used in which one of the plates 74 or 76 is fixedly mounted while the other is free to move; doing so would however tend to compromise somewhat the stability provided by the illustrated system. It will also be apparent to those skilled in the art that numerous alternative mounting systems can be substituted for those described. Designs for mounts, by which relatively displaceable parallel mirrors can be kept aligned to within a few arc-seconds, have been disclosed for example by Jones, R. V. 1962 "Some Use of Elasticity in Instrument Design" *J. Sci. Instrum.*, 39, 193–203 (note in particular the parallel spring movement illustrated on page 196); Jones, R. V. and Young, I. R. 1956 "Some Parasitic Deflections in Parallel Spring Movements" *J. Sci. Instrum.*, 33, 11–15; Bradley, D. J. 1962 "Parallel Movement for High Finesse Interferometric Scanning" *J. Sci. Instrum.*, 39, 41–45; and Smith, S. T. et al 1987 "Design and Assessment of Monolithic High Precision Translation Mechanisms" *J. of Physics E.* 20, 977–983 (note in particular the simple compound rectilinear spring arrangement illustrated on page 978).

Figure 7:
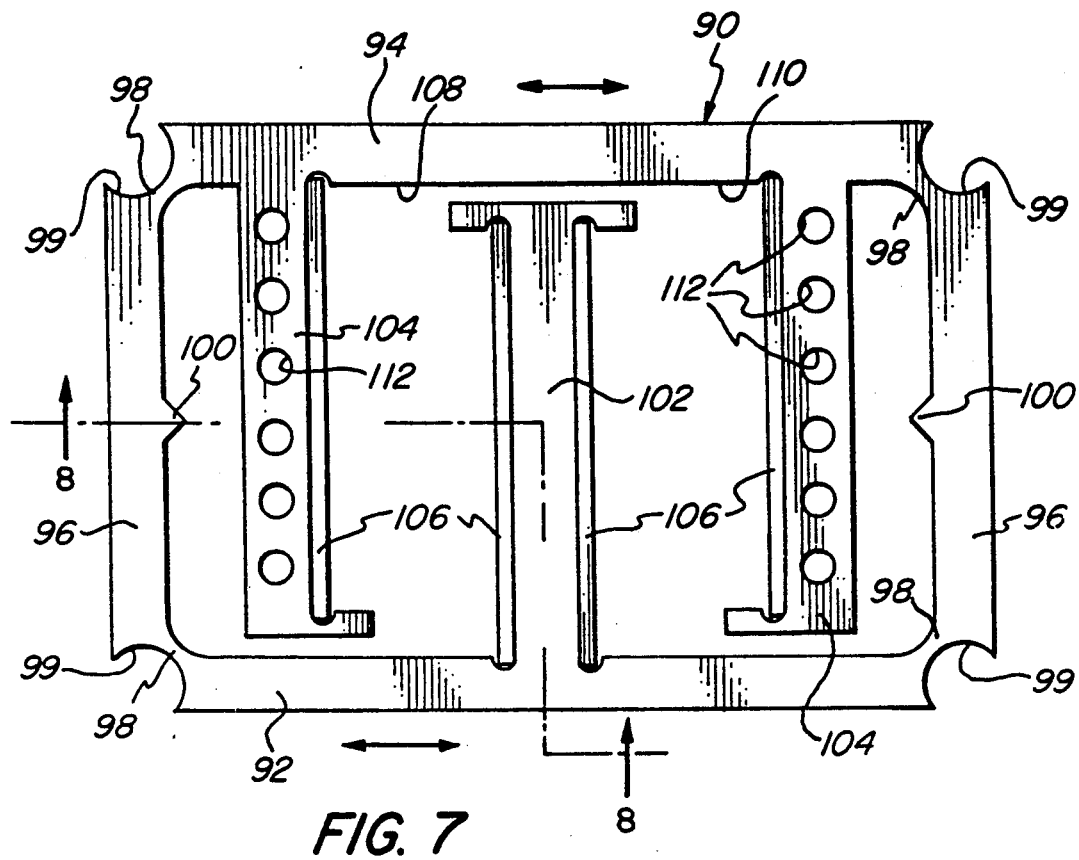
FIG. 7 is a plan view of a more specific form of mounting system of the kind shown in FIG. 6.
Figure 8:
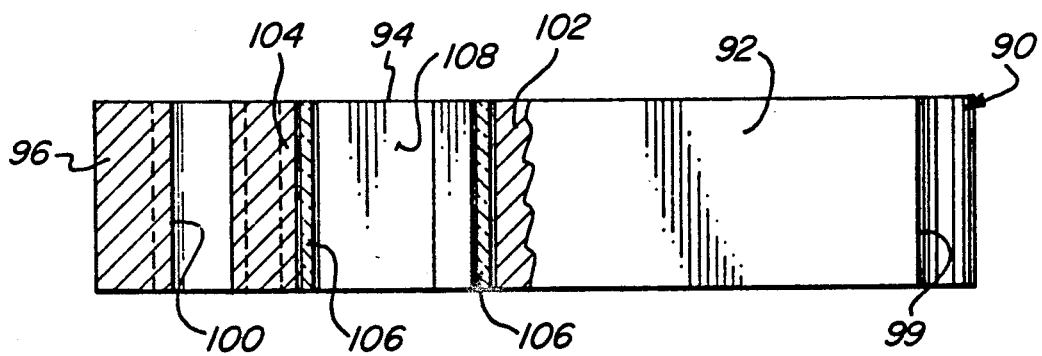
FIG. 8 is a elevational view of the mounting system of FIG. 7, taken in partial section along line 8—8 thereof.

Turning finally to FIGS. 7 and 8, the assembly shown therein is comprised of a unitary mounting body, generally designated by the numeral 90, which may be machined or otherwise formed from a single, rectangular block of metal or the like. It consists of front and rear walls 92, 94, respectively, and end walls 96, the four walls being joined at the corners by flexible hinge elements 98, formed by cutting grooves 99 of semicircular cross section therealong. Pivot edges 100 project inwardly from along the internal surfaces of the end walls 96, midway along their lengths and into registry with the flexural plane of the adjacent hinge elements 98, which edges 100 serve to mount the body 90 on suitable support structure (not shown). A central interior wall 102 projects rearwardly from the front wall 92 to a point short of the rear wall 94, and two lateral walls 104 project forwardly from the rear wall 94 to points short of the front wall 92 and with equidistant spacing from the central wall 102. Plane mirrors 106 are secured against the four confronting faces of the walls 102 and 104, to define reflective channels 108 and 110 therebetween. As will be appreciated, the application of force (by means not shown) to one of the exterior walls of the body 10 will serve to produce the necessary displacement of the reflective surfaces defining the channels 108, 110, in accordance with the disclosure hereinabove provided.

The mounting body 90, used in the assembly of FIGS. 7 and 8, is (like that of FIG. 6) advantageous in providing a structure that is mechanically balanced about pivot edges 100. Such structure will normally include means by which the center of gravity can be located precisely on the axis of pivoting; removal of material from holes, such as those shown at 112 in FIG. 7, could serve that purpose (in addition to reducing the overall mass of the body).

The parallel nature of the facing mirrors of the channels, in all embodiments of the interferometer, ensures that a beam entering the channel, and making an even number of reflections, will emerge from the channel in a direction parallel to the entry beam. When an exit beam is reflected from a retroreflector, such as a perpendicular plane mirror or a cats eye, it will travel the same path in reverse, back to the beamsplitter. A retroreflector in the path of the other beam ensures that it will be similarly returned to the same spot on the beamsplitter, as is necessary, for satisfactory operation of the instrument.

It should be understood that strict optical parallelism is not required between the axes of confronting reflective surfaces by which the channels of the device are defined, and that deviations on the order of several degrees may be tolerable; i.e., the surfaces need only be "substantially" parallel (as used herein, the axis of a planar surface refers to any optical axis that can be defined on it). The parallelism that must exist between confronting, channel-defining reflective surfaces can be stated alternatively, as follows: axes perpendicular to those reflective surfaces must lie substantially in a common plane, to which common plane the longitudinal axis of the channel must be perpendicular.

On the other hand, it is essential that any movable, channel-defining mirror be displaced without change of its angular orientation (i.e., that the specular surface thereof be maintained in planes that are strictly parallel), and also that the beam exiting a channel be retroreflected precisely along the incident path, or along a path that is strictly parallel to the incident path (e.g., the path of a beam that has been shifted upwardly or downwardly, as by a cube corner reflector). This will ensure that both component beams return to a common location on the beamsplitter, and that they register exactly with one another, so as to enable recombination in a highly accurate manner. Reference herein to "virtually" the same path is intended therefore to encompass the path of the incident beam, as well as paths that are strictly parallel to it. While enduring the trueness of the path retraced by the returning beam, the retroreflecting mirror or other element can also serve to compensate for any deviation from parallelism that might exist between the channel defining reflective surfaces, and the retroreflector may be made adjustable for that purpose. This capability introduces yet further flexibility into the specifications that are used in designing interferometers and spectrometers embodying the instant invention.

Multiple reflections within the reflective channel(s) of the instant interferometer allow a large total path length change to be accomplished with a very small amount of motion of the movable wall, and that is true of all of the channel designs hereinabove described. Consider for example the geometry of FIG. 4, in which two beam components exit a beamsplitter at 45° and enter two channel reflectors which are aligned parallel to the beamsplitter, and in which an interior mirror moves in opposite directions with respect to two facing mirrors, so as to simultaneously make one channel wider and one channel narrower. If the beams reflect twice at each facing mirror, or four times in traversing each channel in a single direction (as shown), the total difference in the round trip path from the beamsplitter, to the retroreflector, and back to the beamsplitter will be 11.3 times the linear displacement of the mirrors.

Although the optical systems described provide inherent immunity to rotation or displacement of the channel mirrors, as long as their reflective faces remain parallel, it may be desirable to increase mechanical insensitivity to shocks and rotations of the spectrometer by using counterbalance weights or the like (as mentioned above) to relocate (as necessary) the center of gravity at the pivot points. Other modifications may also be made without departure from the novel concepts hereof, as will be apparent to those skilled in the art.

Thus, it can be seen that the present invention provides a novel interferometer that affords high levels of resolution and accuracy, while also being compact, stable and reliable, insensitive to normal vibration, thermal expansion effects, tilting, and misalignment forces, and of relatively incomplex design and construction. The invention also provides a novel system employing such an interferometer, as well as a novel method that utilizes the principles embodied in it. The system is ideal for use in process monitoring applications in which long unattended operation is required, as well as for continuous emission monitoring, analytical applications, and the like.

Having thus described the invention, what is claimed is:

1. A two beam interferometer comprising:
mounting means;
first and second walls supported by said mounting means and spaced from one another so as to define a channel having opposite ends and a longitudinal axis extending therebetween, said walls having confronting, specularly reflecting planar surfaces extending longitudinally along said channel on axes substantially parallel to said longitudinal axis, and said mounting means supporting said walls for relative movement so as to vary the spacing therebetween while maintaining the orientation of said axes of said reflecting surfaces;
a beamsplitter disposed at one end of said channel; and
retroreflecting means disposed at the opposite end of said channel, whereby electromagnetic radiation impinging upon said beamsplitter may be partially directed therefrom into said channel toward said opposite end, to reflect alternatingly between said reflecting surfaces along a path onto said retroreflecting means, and may be returned thereby along virtually the same path to said beamsplitter.

2. The interferometer of claim 1 wherein said mounting means is of parallelogrammic character, and comprises at least one pair of linking members, each having opposite end portions spaced from one another, one end portion of both of said members being operatively attached to said first wall and the opposite end portion thereof being operatively attached to said second wall, said linking members and said end portions thereof being so constructed, spaced and attached as to constrain said first wall to movement, relative to said second wall, in parallel planes.

3. The interferometer of claim 1 wherein said reflecting surfaces are substantially parallel to one another and to said plane of said second wall.

4. The interferometer of claim 1 wherein said mounting means is of pendulous character, and comprises fixed support structure and a depending linking member having opposite end portions spaced from one another along a longitudinal axis of said linking member, one of said end portions being rotatably attached to said support structure and the opposite end thereof being attached to said first wall, said linking member being so constructed and attached as to suspend said first wall and constrain it against angular displacement about said axis of said linking member.

5. The interferometer of claim 4 wherein said reflecting surfaces are so constructed and disposed as to compensate for the tilting that occurs in said first wall, relative to a plane of said second wall, as a result of the pendulous motion of said first wall.

6. The interferometer of claim 5 wherein each of said reflecting surfaces comprises two planar components so disposed as to form with one another an elongated, right-angle corner reflector.

7. The interferometer of claim 1 additionally including second retroreflecting means disposed to receive radiation directed thereto from said beamsplitter along a second path, and to reflect such received radiation for return to said beamsplitter along virtually said second path.

8. The interferometer of claim 1 wherein said planar surfaces are so configured, and said beamsplitter and retroreflecting means are so disposed with respect thereto, as to cause a beam of radiation to reflect at least twice from each of said surfaces while traversing said path in each direction.

9. The interferometer of claim 1 wherein said arrangement is such as to cause an even number of reflections to occur on each of said reflecting surfaces in each direction along said path.

10. The interferometer of claim 1 wherein said retroreflecting means is selected from the group consisting of plane mirrors and cats eye reflectors.

11. The interferometer of claim 1 additionally including a third wall supported by said mounting means spaced from said first and second walls with said first wall interposed between said second and third walls, said first and third walls defining a second channel having opposite ends, in general registry with said opposite ends of said first-mentioned channel, and a longitudinal axis extending therebetween substantially parallel to said axis of said first channel, said first and third walls having confronting, specularly reflecting planar surfaces extending longitudinally along said second channel on axes substantially parallel to said axis thereof, said mounting means supporting said walls for relative movement of said first wall with respect to said second and third walls, and with said second and third walls in fixed positions with respect to one another, so as to simultaneously vary the spacing of said first wall from said second and third walls while maintaining the orientation of said axes of all of said reflecting surfaces; said beamsplitter being disposed at one end of both of said channels effectively intermediate said second and third walls; and said interferometer further including second retroreflecting means disposed at the opposite end of said second channel, whereby such radiation may be partially directed from said beamsplitter into said second channel, to so reflect along a second path onto said second retroreflecting means and be returned virtually therealong to said beamsplitter.

12. In a spectrometer, comprising means for producing a collimated beam of electromagnetic radiation; a two-beam interferometer; a sample compartment; a photoconductive detector; electronic data processing means; transfer optics for transferring a radiation beam from said means for producing, sequentially through said interferometer and said sample compartment, and onto said detector; and circuitry operatively electrically interconnecting the components of said spectrometer, the improvement wherein said interferometer comprises:
mounting means;
first and second walls supported by said mounting means and spaced from one another so as to define a channel having opposite ends and longitudinal axis extending therebetween, said walls having confronting, specularly reflecting planar surfaces extending longitudinally along said channel on axes substantially parallel to said longitudinal axis, and said mounting means supporting said walls for relative movement so as to vary the spacing therebetween while maintaining the orientation of said axes of said reflecting surfaces;
a beamsplitter disposed at one end of said channel; and retroreflecting means disposed at the opposite end of said channel; whereby electromagnetic radiation originating from said means for providing and impinging upon said beamsplitter, may be partially directed therefrom into said channel toward said opposite end, to reflect alternatingly between said reflecting surfaces along a path onto said retroreflecting means, and be returned thereby along virtually the same path to said beamsplitter, and may thereafter be passed through said sample compartment and onto said detector, generating an electrical signal for analysis by said data processing means.

13. The spectrometer of claim 12 wherein said spectrometer is a Fourier-transform spectrometer.

14. A reflective channel-defining assembly for a two beam interferometer, comprising a body including four rigid frame members having contiguous lateral margins along which they are interconnected by flexible joints, and forming a generally rectangular frame within which an open space is defined, a first internal wall projecting into said space from one of said frame members toward an opposing frame member, and a second internal wall projecting into said space from said opposing member toward said one frame member, said internal walls having mutually confronting faces; and means for providing specularly reflecting planar surfaces on said confronting faces, said reflecting surfaces being disposed in laterally spaced planes substantially parallel to one another and defining a reflective channel therebetween that extends through said body.

15. The assembly of claim 14 wherein said means for providing consist of a plurality of plane mirrors.

16. The assembly of claim 14 wherein said body additionally includes pivot elements so disposed on the other two of said frame members as to permit pivoting thereof and consequential shifting of said one and opposing frame members, simultaneously and in opposite directions along substantially parallel axes, so as to in turn reciprocally widen and narrow said channel defined between said reflecting surfaces.

17. The assembly of claim 14 wherein said body includes a third internal wall projecting into said space from said opposing frame member toward said one frame member and laterally spaced from said first internal wall to the opposite side from said second wall, said first and third walls having mutually confronting faces, said faces on said first and third walls having means thereon for providing specularly reflecting surfaces so disposed, and defining therebetween a second reflective channel extending through said body.

18. The assembly of claim 14 wherein said body is of unitary construction, integrally formed as a single piece.

19. The assembly of claim 18 wherein said flexible joints are defined by channels of reduced cross sectional dimensions extending along said contiguous margins of said frame members.

20. A method for amplitude modulation of a beam of electromagnetic radiation, comprising the steps:
(a) providing a channel having opposite ends and a longitudinal axis therebetween, said channel being defined by confronting, specularly reflecting planar surfaces extending on axes substantially parallel to said longitudinal axis;
(b) causing a source beam of electromagnetic radiation to impinge upon a beamsplitter, so as to produce therefrom a first beam component and a second beam component;
(c) directing one of said beam components into one end of said channel toward the opposite end thereof and at an acute angle to said axis, so as to cause said one beam component to reflect alternatingly between said reflecting surfaces along a first path;
(d) retroreflecting said one beam component from the opposite end of said channel so as to cause it to return along virtually said first path to the beamsplitter;
(e) continuously varying the spacing between said reflecting surfaces while maintaining the orientation of said axes thereof and while causing said one beam component to so traverse said first path; and (f) simultaneously with step (e) directing the other of said beam components along a second path, and retroreflecting it to return virtually therealong to the beamsplitter, said first and second beam components being recombined at the beamsplitter in varying phase relationships to one another so as to produce an amplitude modulated beam thereat.

21. The method of claim 20 wherein a second channel is provided adjacent said first channel, said second channel having opposite ends and a second longitudinal axis therebetween, and being defined by confronting, specularly reflecting planar surfaces extending on axes parallel to said second longitudinal axis; and wherein, in said step (f), said other beam component is directed into said second channel to traverse said second path therethrough.

22. The method of claim 20 wherein said source beam is of spectral character, and wherein said modulated beam is caused to impinge upon a sample, and thereafter upon a photoconductive detector, so as to produce an interferogram signal containing information indicative of an optical property of said sample.

23. The method of claim 22 additionally including a step of analysis of said interferogram signal so as to determine a value for said optical property.

24. The method of claim 22 wherein said source beam is of electromagnetic radiation in the infrared region of the spectrum, and wherein said step of analysis is effected using a Fourier transform technique.

25. The method of claim 20 wherein said first beam component makes an even number of reflections on each of said reflecting surfaces in each direction along said first path.

* * * * *